US007439488B2

(12) United States Patent
Chen

(10) Patent No.: US 7,439,488 B2
(45) Date of Patent: Oct. 21, 2008

(54) POSITIONING APPARATUS AND METHOD THEREOF

(75) Inventor: Jiunn-Jiang Chen, Hsinchu (TW)

(73) Assignee: Aetas Systems Incorporated, Hsinchu (TW)

( * ) Notice: Subject to any disclaimer, the term of this patent is extended or adjusted under 35 U.S.C. 154(b) by 213 days.

(21) Appl. No.: 11/495,612

(22) Filed: Jul. 31, 2006

(65) Prior Publication Data

US 2007/0098443 A1 May 3, 2007

(30) Foreign Application Priority Data

Nov. 1, 2005 (TW) .............................. 94138315 A

(51) Int. Cl.
*G01D 5/347* (2006.01)
*B41J 29/393* (2006.01)

(52) U.S. Cl. ............................ 250/231.13; 250/559.29; 250/234; 33/707; 347/19

(58) Field of Classification Search ............ 250/231.13, 250/231.14, 231.16, 559.29, 559.39, 234–235; 33/706–707; 347/3, 19, 234–235, 262
See application file for complete search history.

(56) References Cited

U.S. PATENT DOCUMENTS 4,832,518 A * 5/1989 Moriyama .................. 400/322
2006/0279597 A1 * 12/2006 Ishimoto et al. ............... 347/16

* cited by examiner

*Primary Examiner*—Kevin Pyo
(74) *Attorney, Agent, or Firm*—Rabin & Berdo, P.C.

(57) ABSTRACT

A positioning apparatus for a printer is provided. The positioning apparatus includes at least one encoder, an OPC belt, and a code strip consisting of a reference bar code region, a blank region and normal bar code region. The OPC belt is moved relatively to the encoder and has a joint region. The code strip is mounted on the OPC belt and has a plurality of bar codes. The encoder is used for detecting the bar codes and generating a displacement signal representing a displacement of the OPC belt moved relatively to the encoder. The blank region may be adjoined the joint region. Therefore, a home position can be located precisely by the displacement signal due to the existence of the reference bar code region and blank region. Moreover, a positioning method for a printer is also disclosed.

13 Claims, 3 Drawing Sheets

POSITIONING APPARATUS AND METHOD THEREOF

RELATED APPLICATIONS

The present application is based on, and claims priority from, Taiwan Application Serial Number 94138315, filed Nov. 1, 2005, the disclosure of which is hereby incorporated by reference herein in its entirety.

BACKGROUND

1. Field of Invention

The present invention relates to a positioning apparatus for a printer. More particularly, the present invention relates to an apparatus and a method for locating the home position or the reference position in a printer.

2. Description of Related Art

With the rapid development in the electronic industry, printing apparatuses such as copiers and printers have been widely used in daily life. The copiers and laser printers are already popular in various kinds of places, including companies, offices and families. The operations of copiers and laser printers rely on electrophotographic printing techniques. Advanced electrophotographic printing techniques enable manufacturers to provide the SOHO and families with high-quality laser printing image.

The use of color computer multimedia further increases the need of color copiers and printers. Laser printers employ complicated electrophotographic printing configuration and process to form images on an output medium. The standard electrophotographic printing processes include seven steps: charging, exposing, developing, transferring, fusing, cleaning, and erasing. The standard color printing of color printers further involves four different colored toners: yellow, magenta; cyan, and black.

In order to improve the quality of printing, quadrature incremental encoders are applied to the printers for providing the real-time displacement and speed of the organic photoconductor (OPC) belt and controlling the light source to expose predetermined positions on OPC belt at a proper moment. Furthermore, how to precisely locate the home position on the OPC belt after each pass is very important for a multi-pass printer to achieve perfect color registration. Traditionally, the home position can not be located precisely by the encoders. Thus, a home sensor with high precision is needed but it would substantially increase the manufacturing cost of the printers.

For the forgoing reasons, how to precisely locate the home position on the OPC belt without the extra expensive home sensor is what both manufacturers and users are longing for.

SUMMARY

It is therefore an aspect of the present invention to provide a positioning apparatus for a printer. The positioning apparatus employs at least one encoder to locate the home position on the OPC belt precisely. Moreover, a home sensor is no longer required in the positioning apparatus.

It is another aspect of the present invention to provide a positioning apparatus for a printer. The positioning apparatus provides a reference bar code region and a blank region adjacent thereto for locating the home position precisely.

It is still another aspect of the present invention to provide a positioning apparatus for a printer. The positioning apparatus does not require any home sensor so the manufacturing cost of the printer can be reduced.

In accordance with the foregoing and other aspects of the present invention, a positioning apparatus for a printer is provided. The positioning apparatus includes at least one encoder, an OPC belt, and a code strip containing a blank region. The OPC belt is moved relatively to the encoder and has a joint region. The code strip is mounted on the OPC belt and has a plurality of bar codes. The encoder is used for detecting the bar codes and generating a displacement signal representing a displacement of the OPC belt moved relatively to the encoder. The blank region may be adjoined the joint region. Therefore, a home position can be located precisely by the displacement signal due to the existence of the blank region.

Furthermore, the code strip may have a reference bar code region. The reference bar code region is adjacent to a first end of the blank region to ensure the home position can be located more precisely.

According to another embodiment of the present invention, a positioning method for a printer is provided. The positioning method includes the following steps: First, a code strip is detected by a first encoder, wherein the code strip is moved relatively to the first encoder. When a non bar code region is detected by the first encoder and a displacement recorder is off, the displacement recorder is started and reset. A displacement of the code strip moved relatively to the first encoder is recorded by the displacement recorder. When the non bar code region is detected again by the first encoder, the displacement recorder is reset. Finally, a home position is located when the displacement recorded by the displacement recorder reaches a home threshold.

In conclusion, the positioning apparatus and the positioning method according to the mentioned embodiments employ at least one encoder to locate the home position precisely without any home sensor. In addition, the home position can be precisely obtained if the blank region and the reference bar code region exist.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
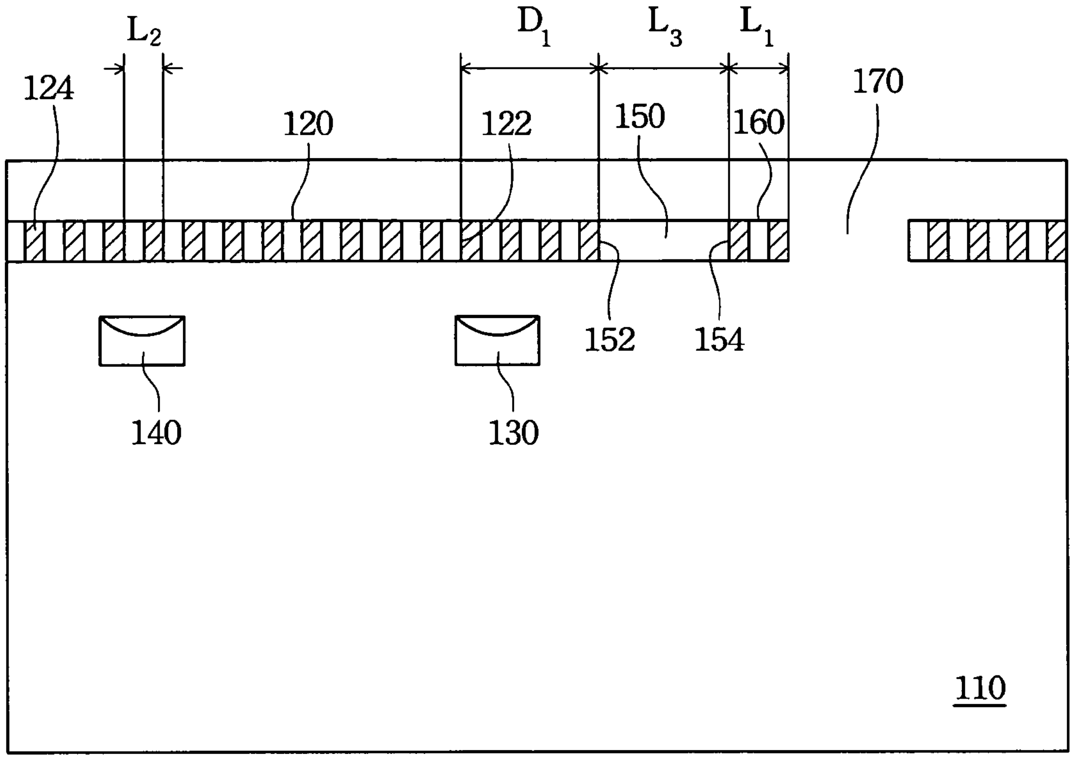
FIG. 1 is a diagram illustrating a positioning apparatus for a printer according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

References are made to FIG. 1, a diagram illustrating a positioning apparatus for a printer according to one preferred embodiment of this invention. In FIG. 1, a positioning apparatus for a printer is provided. The positioning apparatus includes an OPC belt 110, a code strip 120, a first encoder 130, and a second encoder 140. The OPC belt 110 is moved relatively to the first encoder 130 and the second encoder 140 and has a joint region 170. The code strip 120 is mounted on the OPC belt 110 and has a plurality of bar codes 124 and a blank region 150. The first encoder 130 and the second encoder 140 are used for detecting the bar codes 124 and generating displacement signals representing displacements of the OPC belt 110 moved relatively to the first encoder 130 and the second encoder 140. A home position 122 can be located precisely by the displacement signal. The blank region 150 may be adjoined the joint region 170.

Figure 4:
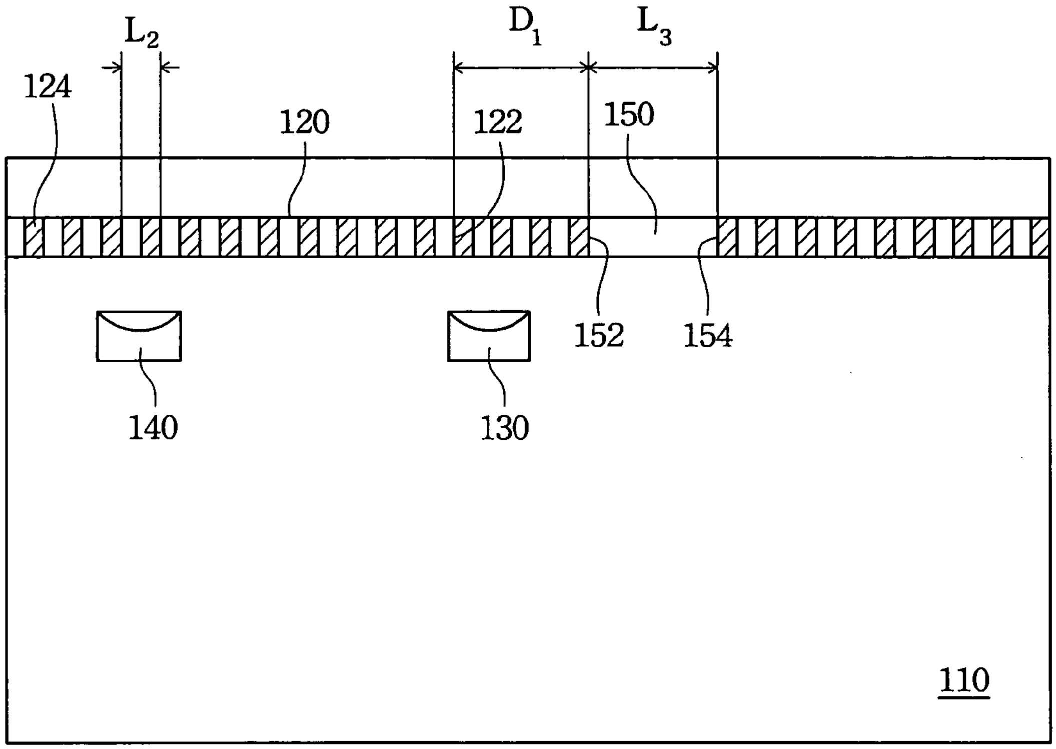
FIG. 4 is a diagram illustrating a positioning apparatus for a printer according to another preferred embodiment of this invention.

When the joint region 170 is detected by the first encoder 130, noise may be generated by the first encoder 130. The noise may result in errors when the first encoder 130 detects the start point of the bar codes 124 of the code strip 120. Therefore, the blank region 150 disposed near the joint region 170 is used for separating the displacement signal generated by the first encoder 130 from the noises to prevent noises from interfering with locating the home position 122. Further, in the second embodiment of this invention, the code strip 120 is enclosed (Refer to FIG. 4), and the blank region 150 is overlapped the joint region 170, and the noises are prevented thereof.

In the first embodiment, the code strip 120 may have a reference bar code region 160. The reference bar code region 160 is adjacent to a first end 154 of the blank region 150 to make a comeback of encoder signal after encoder passes through joint region 170 and to allow the home position 122 to be located more precisely.

Moreover, the reference bar code region 160 has a width L1 smaller than a distance D1 between the home position 122 and a second end 152 of the blank region 150. In addition, the width L1 of the reference bar code region 160 may be not less than the width L2 of one period of the bar codes 124 of the code strip 120 to prevent the home position 122 from being erroneously located. Similarly, in order to prevent the home position 122 from being erroneously located, a width L3 of the blank region 150 may be larger than a threshold of a non bar code region (the non bar code region includes the blank region 150 and the joint region 170), and the threshold is used for determining whether the non bar code region (such as the blank region 150 or the joint region 170) is detected by the first encoder 130. The threshold of the non bar code region will be illustrated latter.

According to another embodiment of the present invention, a positioning method for a printer is provided. The positioning method is accomplished by the positioning apparatus shown in FIG. 1 so please refer to FIG. 1 continuously. The positioning method includes the following steps (Notice: The order of the steps may vary, may be sequential, may repeat, may be concurrent, and combinations thereof, if not otherwise stated.): First, a code strip 120 is detected by a first encoder 130, wherein the code strip 120 is moved relatively to the first encoder 130. When a non bar code region (such as the blank region 150 or the joint region 170) is detected by the first encoder 130 and a displacement recorder is off, the displacement recorder is started and reset. A displacement of the code strip 120 moved relatively to the first encoder 130 is recorded by the displacement recorder. When the non bar code region is detected again by the first encoder 130, the displacement recorder is reset. Finally, a home position 122 is located when the displacement recorded by the displacement recorder reaches a home threshold. Furthermore, the displacement recorder may be turned off after the home position 122 is located.

Generally, the home position 122 is located on the code strip 120 and near the blank region 150 on the code strip 120, and the distance D1 between the home position 122 and the second end 152 of the blank region 150 is the home threshold. When the non bar code region is detected by the first encoder 130, the displacement recorded by the displacement recorder is less than the actual displacement. Only when the bar codes 124 of the code strip 120 are detected by the first encoder 130, the displacement recorded by the displacement recorder can represent the actual displacement. Therefore, when the non bar code region is detected by the first encoder 130, the displacement recorder is started and reset, and the displacement is then recorded by the displacement recorder. When the displacement recorded by the displacement recorder reaches the home threshold, the home position 122 is located reliably.

Figure 2:
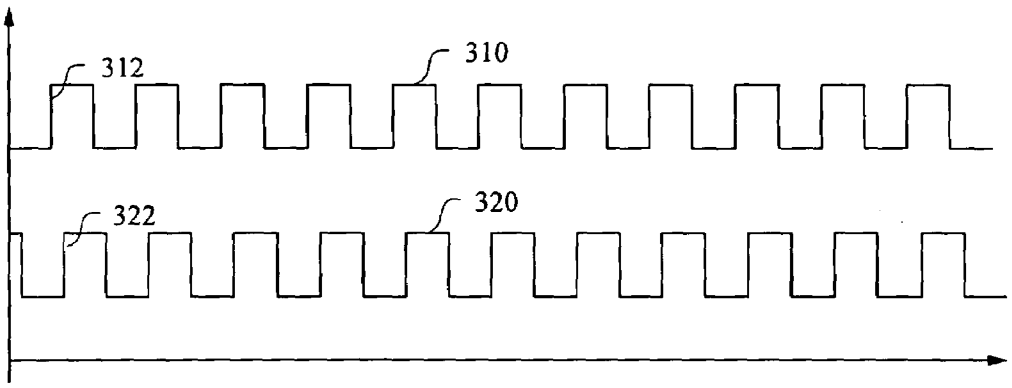
FIG. 2 is a waveform chart illustrating the displacement signals generated by the encoders when the bar codes are detected.

Refer to FIG. 1 and FIG. 2. FIG. 2 is a waveform chart illustrating the displacement signals generated by the first encoder 130 and the second encoder 140 when the bar codes 124 are detected. Waveform 310 shows a first displacement signal generated by the first encoder 130 when the bar codes 124 of the code strip 120 are detected by the first encoder 130. Waveform 320 shows a second displacement signal generated by the second encoder 140 when the bar codes 124 of the code strip 120 are detected by the second encoder 140. Generally, a quadrature incremental encoder can output two signals with phase A and phase B respectively and the phase difference between the two signals is 90 degrees. However, one signal with either phase A or phase B is sufficient to locate the home position.

Refer to FIG. 1 and FIG. 2. A distance between the first encoder 130 and the second encoder 140 may be larger than the sum of the width of the joint region 170, the width of the reference bar code region 160 and the width of the blank region 150. The method for detecting whether the non bar code region is detected by the first encoder 130 includes: First, a counter is set. When the second displacement signal (waveform 320) has a rising edge variation 322 (that is, one of the bar codes 124 of the code strip 120 is detected by the second encoder 140), one is added to the counter. When the first displacement signal (waveform 310) has a rising edge variation 312 (that is, one of the bar codes 124 of the code strip 120 is detected by the first encoder 130), the counter is reset. Although the counter is triggered by a rising edge variation in this embodiment, the counter may also be triggered by a specific level of variation, a rising edge variation or a falling edge variation. When the bar codes 124 are detected by both of the first encoder 130 and the second encoder 140, the counter may be added by a small amount and then reset. Similarly, when the first encoder 130 detects bar codes 124 while the second encoder 140 detects the non bar code region, the counter may also be added by nothing or a small amount and then reset. Therefore, when the value of the counter is less than a threshold of the non bar code region, the bar codes 124 of the code strip 120 are detected by the first encoder 130. The threshold of the non bar code region plays the role of a filter to tolerate a phase difference between the first displacement signal and the second displacement signal. The phase difference results from mechanical inaccuracy of the first encoder 130 and the second encoder 140. In addition, the strain of the OPC belt 110 due to tension variation may also affect the first displacement signal and the second displacement signal as well.

Figure 3:
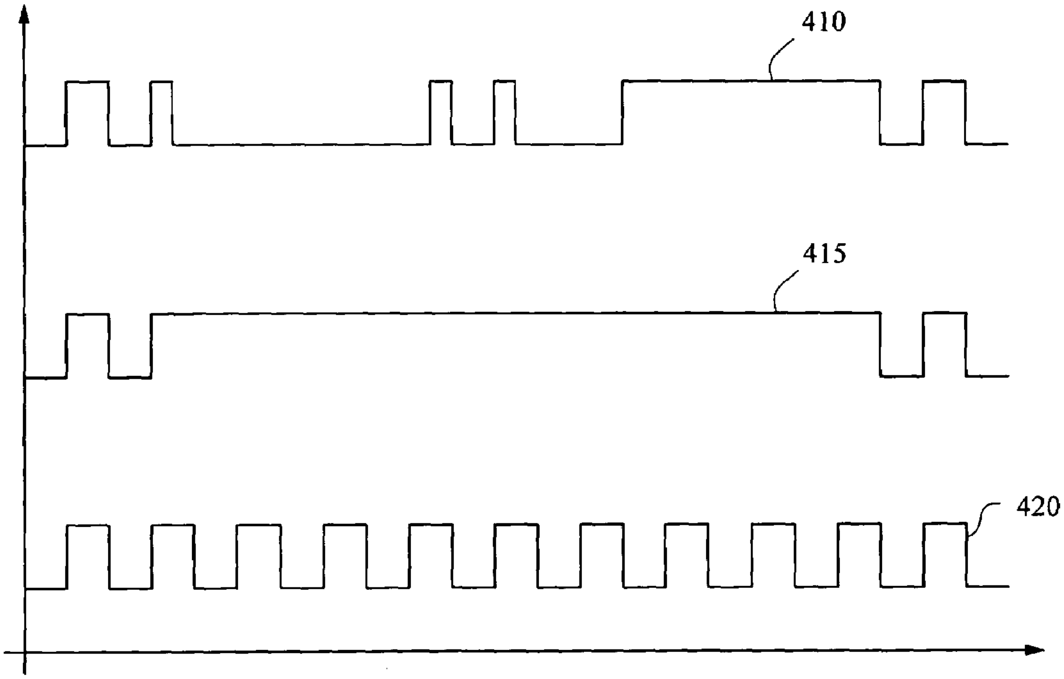
FIG. 3 is a waveform chart illustrating the displacement signals generated by the encoders when the non bar code region is detected.

Refer to FIG. 1 and FIG. 3. FIG. 3 is a waveform chart illustrating the displacement signals generated by the first encoder 130 and the second encoder 140 when the non bar code region is detected by the first encoder 130. Waveform 410 shows a first displacement signal generated by the first encoder 130 when the joint region 170 is detected by the first encoder 130. Waveform 415 shows a first displacement signal generated by the first encoder 130 when the blank region 150 is detected by the first encoder 130. Waveform 420 shows a second displacement signal generated by the second encoder 140 when the bar codes 124 of the code strip 120 are detected by the second encoder 140. Generally, when the first encoder 130 detects the non bar code region (the blank region 150 or the joint region 170), the frequency of the first displacement signal (the number of times that the rising edge variation appears within a particular period of time) is lower than the frequency of the second displacement signal. Therefore, once the value of the counter is larger than the threshold of the non bar code region, the first encoder 130 detects the non bar code region, such as the blank region 150 or the joint region 170.

Moreover, the first displacement signal (waveform 410) may have noises with low frequency when the joint region 170 is detected by the first encoder 130, and thus the counter may be reset several times when the joint region 170 is detected by the first encoder 130. However, the counter is reset one time when the first encoder 130 detects the blank region 150. Therefore, the noises interference resulting from the joint region 170 is eliminated completely by the blank region 150.

Besides employing the second encoder to generate the second displacement signal, a simulate signal, representing the moving speed of the OPC belt, may replace the second displacement signal so the second encoder can be omitted. The simulate signal has a period representing the actual displacement of the code strip moved relatively to the first encoder. The detailed steps are illustrated as the following: First, a simulate signal is generated. One is added to a counter when the simulate signal has a rising edge variation. The counter is reset when one of the bar codes 124 of the code strip 120 is detected by the first encoder 130. Similarly, when the value of the counter is smaller than the threshold of the non bar code region, the first encoder 130 detects the bar codes 124 of the code strip 120. On the other hand, once the value of the counter is larger than the threshold of the non bar code region, the first encoder 130 detects the non bar code region (such as the blank region 150 or the joint region 170).

In addition, the step of recording the displacement of the code strip 120 moved relatively to the first encoder 130 may be preformed by another counter. The detail steps are illustrated as the following: First, a counter is set. When the non bar code region is detected by the first encoder 130 and the counter is off, the counter is started and reset. One is added to the counter when the first encoder 130 detects the bar codes 124 of the code strip 120, that is, the first displacement signal generated by the first encoder 130 has a rising edge variation. When the non bar code region is detected again by the first encoder 130, the counter is reset. Finally, the home position 122 is located when the counter reaches the home threshold. Moreover, the counter may be turned off after the home position is located.

More specifically, the home threshold plays the role of a filter. Because the first encoder 130 can not immediately determine whether the bar codes 124 of the code strip 120 adjacent to the blank region 150 is detected, the home threshold is needed to prevent the home position 122 from being erroneously located.

In conclusion, the invention provides advantages as the following:

(1) the positioning apparatus of the present invention does not require any extra home sensor, and thus the printer manufacturing cost is reduced;

(2) the home position is located precisely on the OPC belt due to the existence of the reference bar code region and the blank region for the first embodiment of this invention;

(3) the home position is located precisely on the OPC belt due to the existence of the blank region for the second embodiment of this invention; and (4) the positioning method of the present invention locates the home position precisely by the encoder without the home sensor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A positioning method for a printer comprising steps of:
detecting a code strip by a first encoder, wherein the code strip is moved relatively to the first encoder;
recording a displacement of the code strip moved relatively to the first encoder by a displacement recorder;
resetting the displacement recorder when a non bar code region is detected by the first encoder; and
locating a home position when the displacement reaches a home threshold.

2. The positioning method of claim 1, further comprising:
starting and resetting the displacement recorder when the non bar code region is detected by the first encoder and the displacement recorder is off.

3. The positioning method of claim 1, further comprising:
turning the displacement recorder off after the home position is located.

4. The positioning method of claim 1, wherein the step of resetting the displacement recorder comprises:
detecting the code strip by the first encoder and a second encoder simultaneously;
adding one to a counter when one of a plurality of bar codes of the code strip is detected by the second encoder;
resetting the counter when one of the bar codes of the code strip is detected by the first encoder; and
resetting the displacement recorder when the counter reaches a threshold of a non bar code region.

5. The positioning method of claim 1, wherein the step of resetting the displacement recorder comprises:
generating a simulate signal;
adding one to a counter when the simulate signal has a specific level of variation;
resetting the counter when one of a plurality of bar codes of the code strip is detected by the first encoder; and
resetting the displacement recorder when the counter reaches a threshold of a non bar code region.

6. The positioning method of claim 5, wherein the simulate signal has a period representing the displacement of the code strip moved relatively to the first encoder.

7. The positioning method of claim 5, wherein the specific level of variation is a rising edge variation or a falling edge variation.

8. The positioning method of claim 1, wherein the step of recording the displacement comprises:

adding one to a first counter when one of a plurality of bar codes of the code strip is detected by the first encoder such that the first counter records the displacement of the code strip moved relatively to the first encoder.

9. The positioning method of claim 8, wherein the step of resetting the displacement recorder comprises:

detecting the code strip by the first encoder and a second encoder simultaneously;

adding one to a second counter when one of the bar codes of the code strip is detected by the second encoder;

resetting the second counter when one of the bar codes of the code strip is detected by the first encoder; and resetting the first counter when the second counter reaches a threshold of a non bar code region.

10. The positioning method of claim 8, wherein the step of resetting the displacement recorder comprises:

generating a simulate signal:

adding one to a second counter when the simulate signal has a specific level of variation;

resetting the second counter when one of the bar codes of the code strip is detected by the first encoder; and resetting the first counter when the second counter reaches a threshold of a non bar code region.

11. The positioning method of claim 8, wherein the step of positioning the home position comprises:

locating the home position when the first counter reaches a home threshold.

12. The positioning method of claim 1, further comprising:

providing a blank region on the front portion of the code strip.

13. The positioning method of claim 12, further comprising:

providing a reference bar code region adjacent to a first end of the blank region.

* * * * *